(12) United States Patent
Menard et al.

(10) Patent No.: US 6,199,270 B1
(45) Date of Patent: Mar. 13, 2001

(54) ASSEMBLY LINE OF MOUNTED ASSEMBLIES WITH MEANS FOR VERIFICATION

(75) Inventors: Bernard Menard, Guichen; Frédéric Pature, Saint-Malo-de Phily; Jacques Pitou, Ennery, all of (FR)

(73) Assignee: Compagnie Générale des Etablissements Michelin-Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/436,837

(22) Filed: Nov. 9, 1999

Related U.S. Application Data

(63) Continuation of application No. PCT/EP98/02550, filed on Apr. 30, 1998.

(30) Foreign Application Priority Data

May 16, 1997 (FR) .................................................. 97/06283

(51) Int. Cl.[7] .................................................. B23P 21/00
(52) U.S. Cl. .................................. 29/711; 29/709; 29/712; 73/146; 157/1.1; 356/384; 356/387
(58) Field of Search .................................. 73/146; 29/711, 29/714, 712, 717, 709; 356/384, 389; 250/221, 222.1, 231.13, 231.14, 559.15, 559.19, 559.22, 559.23, 559.24; 157/1, 1.1

(56) References Cited

U.S. PATENT DOCUMENTS

| | | | |
|---|---|---|---|
| 2,661,053 | | 12/1953 | Mullen . |
| 3,089,576 | * | 5/1963 | Spaver . |
| 3,633,279 | * | 1/1972 | Frazier . |
| 3,724,958 | * | 4/1973 | Callan .................................. 356/384 |
| 3,728,542 | * | 4/1973 | Golfier . |
| 3,930,141 | * | 12/1975 | Koyama . |
| 4,004,693 | * | 1/1977 | Tsuji . |
| 4,192,613 | * | 3/1980 | Hammar . |
| 4,488,430 | * | 12/1984 | Fujimoto . |
| 4,700,078 | * | 10/1987 | Mizuno . |
| 4,724,704 | * | 2/1988 | Alain . |
| 4,830,079 | | 5/1989 | Onuma . |
| 5,065,694 | * | 11/1991 | Earnheart . |
| 5,267,380 | | 12/1993 | Ronge et al. . |
| 5,616,859 | * | 4/1997 | Rhyne . |
| 5,980,083 | | 11/1999 | Patte et al. . |
| 6,082,191 | * | 7/2000 | Neiferd . |
| 6,119,514 | * | 10/2000 | Picacente . |

FOREIGN PATENT DOCUMENTS

| | | |
|---|---|---|
| 4003848 | 8/1991 | (DE) . |
| 2085818 | 5/1982 | (GB) . |
| 9633877 | 10/1996 | (WO) . |

* cited by examiner

Primary Examiner—S. Thomas Hughes
Assistant Examiner—Steven A Blount
(74) Attorney, Agent, or Firm—Baker Botts L.L.P.

(57) ABSTRACT

An assembly line for mounting tires on wheels, for inflating the tire mounted on a wheel, for placement of the bead heels of the tire and for balancing which also includes apparatus for checking the conformity of the diameter of the tire to be mounted and for checking the conformity of the dimensions of the wheel.

5 Claims, 5 Drawing Sheets

ASSEMBLY LINE OF MOUNTED ASSEMBLIES WITH MEANS FOR VERIFICATION

This is a continuation of PCT/EP98/02550, filed Apr. 30, 1998.

BACKGROUND OF THE INVENTION

The invention concerns an assembly line of tires on their mounting wheels, with a view to obtaining mounted assemblies ready to be delivered at the right time to customers, generally motor vehicle manufacturers. It concerns, in particular, the means designed to use said assembly process and the product quality control means.

Such an assembly line contains, in the manner known through use, conveying means, such as conveyor belts or metal rollers making it possible to route the tires, wheels and mounted assemblies, respectively, from one point to another on the assembly line, said tires and said wheels coming from a supply warehouse by means of suitable pallets. The seats of each wheel rim, said wheel having been centered, as well as the beads of the tire are lubricated to facilitate, in known fashion, the mounting of the tire on the wheel rim, mounting being carried out by means of a mounting machine or mounter and the two beads of the tire being set in place by pressure with the aid of pressure arms and a roller. An inflation bell makes possible the introduction of gas for inflating the assembly by intervals between bead heels of the tire and the wheels.

Various documents describe machines for mounting or assembling tires on their rims. One example of such a machine is described in U.S. Pat. No. 2,661,053. A more advanced machine is described in U.S. Pat. No. 4,830,079 and consists of an apparatus for mounting tires on their rims without concern about the rim dimensions, whatever the diameter or overall width, the dimensions being detected before mounting.

The mounted assembly, inflated to the pressure recommended by the customer, is then conveyed to a machine for placement of the tire heels, which machine, by pressure on the sidewalls of said tire, makes possible a slight rotation of the beads and their repositioning under the effect of the inflation pressure. The mounted assembly, balanced on a balancing machine, is then conveyed on conveyor belts to a storage warehouse, where it will be picked up for delivery to the manufacturers.

The tires and wheels, on their arrival on the conveying means at the beginning of the assembly line, are not totally examined as to their dimensional conformity; only photoelectric cells signal their presence or absence.

The delivery of quality mounted assemblies to a manufacturer requires matching of the tire to the wheel to conform to the manufacturing customer's demand, that is, it requires a good tire to be mounted on a good wheel. The mounted assembly will likewise be a quality product if it matches dimensionally what is requested and if it is inflated to the pressure recommended by the manufacturer.

SUMMARY OF THE INVENTION

In order to satisfy these requirements, the assembly line of mounted assemblies, according to the invention, comprising mainly of a machine for mounting the tire on the wheel, a device for inflating the mounted assembly and a machine for placement of tire bead heels as well as a balancing machine, is characterized in that it further comprises at least one means for checking the conformity of the diameter of the tire to be mounted and means for checking the conformity of the dimensions of the wheel.

One means of measuring the diameter of the tire, a diameter measured at the bead toe, can advantageously consist of photoelectric cell assemblies, placed on blocks above and below the tire laid flat and centered on a support. The disposition and number said cells makes possible the recognition of the diameter of the tire.

As for the means for checking the conformity of the mounting wheel, they advantageously make it possible to measure simultaneously the overall width of the wheel rim and the outline of the wheel disk, while checking at the same time the diameter of the rim, these three measurements being sufficient to characterize and recognize a wheel for a motor vehicle manufacturer. The means employed to make such measurements are advantageously combined in a single unit comprising mainly:

a centering system equipped with a cam-detector assembly and, more specifically, a centering system having a support arm of centering rollers on which a bent rod is fastened, the end of which is capable of moving into the slot of an arm that can be rotated on a fixed pin, said arm being equipped at its end with a metal plate or cam, arcuate in shape and of narrow width, said plate being capable, by rotation on the pin, of being positioned opposite one or more induction detectors integral with a frame, said system making it possible to check the conformity of the wheel diameter, and an apparatus with two independent guide units, on which sensor-detector assemblies are mounted, said sensors being designed to be applied to one of the rim flanges and to the disk respectively and, more specifically, an apparatus composed of a first guide unit making possible, by means of a jack and guide rods, the vertical displacement of a support equipped on its edges with a sensor designed to be applied to one of the flanges of the rim, vertical displacement being measured by means of an ultrasonic detector, and a second guide unit independent of the first, but integral with the support and making possible, by means of a jack and guide rods, the vertical displacement of a support plate, on which is mounted a sensor designed to be applied to the disk of the wheel, a linear potentiometer making it possible to measure the displacement of the support.

It is advantageous for the assembly line to further include a means for detecting an unsuitably mounted assembly; said means can include of a device comprising a system of centering for the mounted assembly and a measuring system including a sensor, driven into one of the sidewalls of the tire with a constant force and combined with a detector capable of measuring said penetration depth.

The characteristics and advantages of the invention will be better understood by reference to the specification which follows and to the drawings unrestrictedly illustrating a working example of the invention:

DESCRIPTION OF PREFERRED EMBODIMENTS

Figure 1:
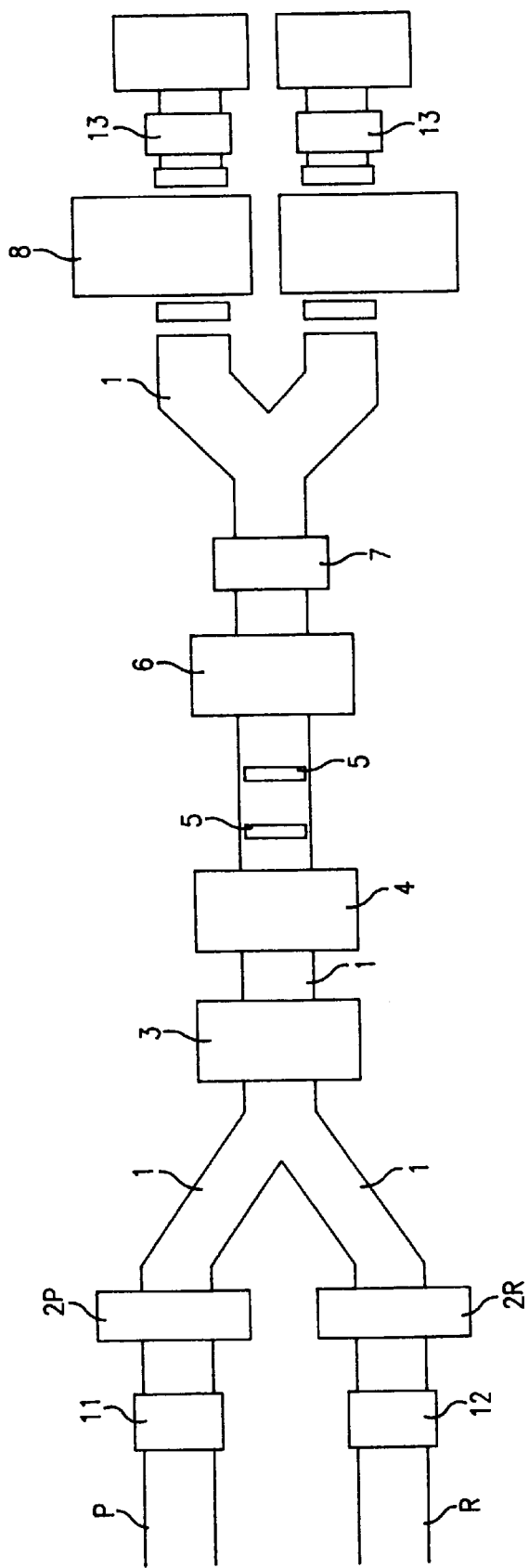
FIG. 1 schematically shows the assembly of machines of the tire assembly line with the location on said line of means for verification according to the invention.

Referring to FIG. 1, wheels R and tires P are fed by conveyors 1. The conveyor of the tires P transports the latter to a diameter measuring device 11, which is located on the assembly line in front of a bead lubricating station 2P. The conveyor of the wheels R routes the latter to a wheel checking machine 12, located on the assembly line in front of a wheel lubricating station 2R. The above-mentioned conveyors 1 are combined in a single conveyor in front of the mounting machine or mounter 3, which places the tire P on the wheel R. The tire P mounted on the wheel R presents an uninflated assembly E at an inflating station, in this case an inflating bell 4 which makes inflation possible by introducing inflating gas between the heels of the tire and the seats of rim J of wheel R. The assembly E leaves the inflating station 4 on a conveyor 1 with conveyor belts between which one or more air curtain ramps 5 are arranged, making possible cleaning of the sidewalls and beads of the tire P. A heel placement machine 6 and a balancer 7 make it possible to obtain an assembly E equipped with compensating weights and which can be stored in a warehouse 8 before delivery to the customer. The apparatus 13 for checking conformity of the mounted assembly E to be delivered is placed between the exit from the warehouse 8 and the entrance into suitable means for transporting the assemblies E to be delivered.

Figure 2A:
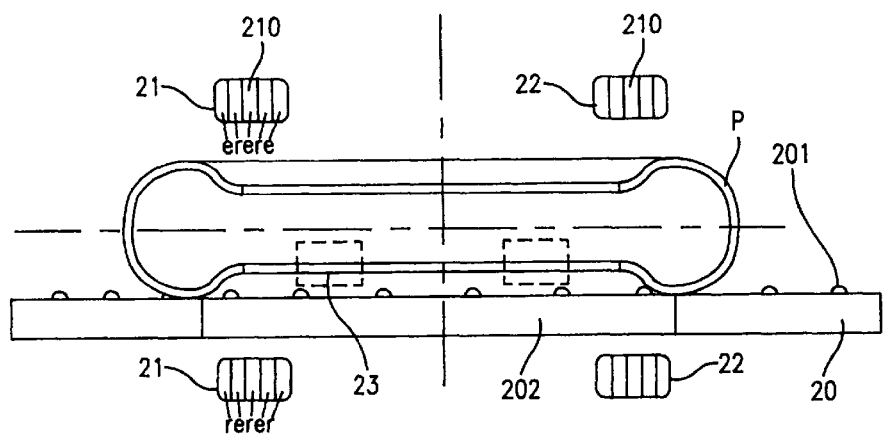
FIG. 2A schematically shows, along a radial plane of the tire, the device for measuring the inner diameter of said tire.
Figure 2B:
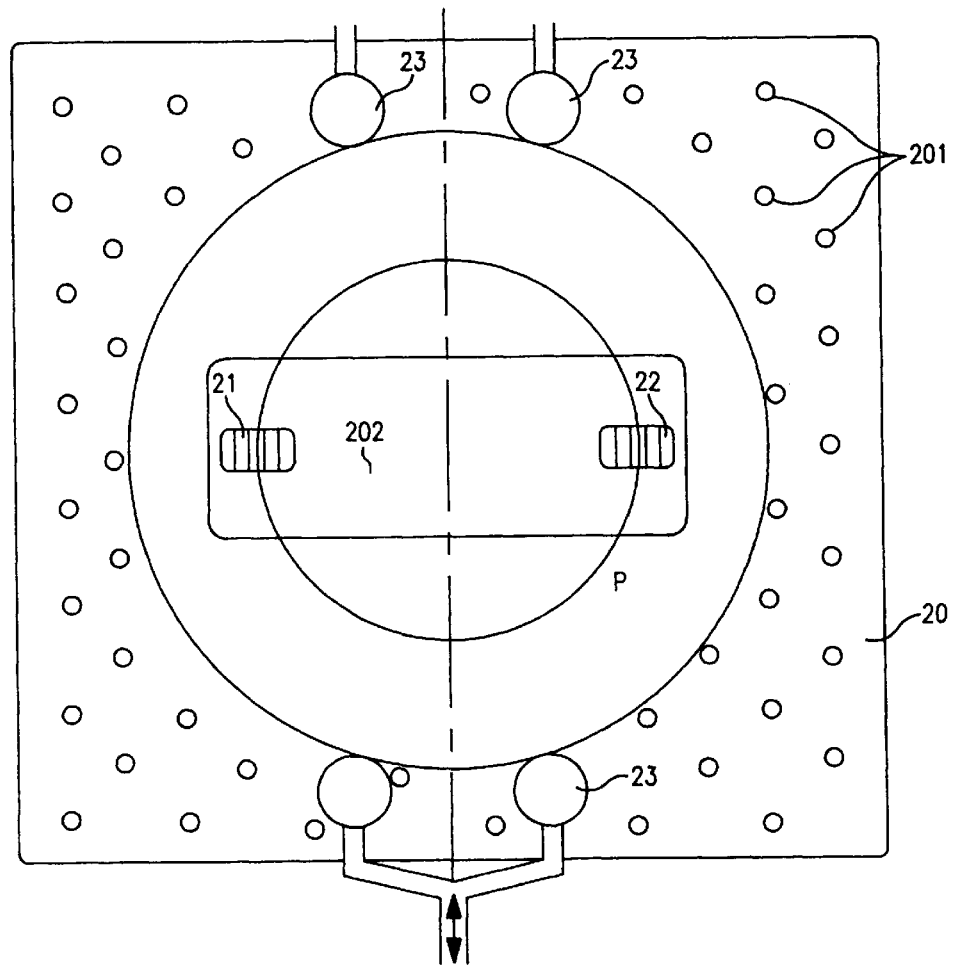
FIG. 2B is a top view of the same device.

FIG. 2A, seen in a radial plane, and FIG. 2B, a top view, show the tire P laid on a table 20 with ball bearings 201 facilitating displacement of the not yet inflated tire and, in particular, centering of said tire by means of four pressure rollers 23, the displacement of which is ensured by a single jack (not shown). The table 20 is provided with an opening 202 wide enough to permit the placement and positioning of an upper assembly 21 of photoelectric cells 210 and of a lower assembly 22 of said cells. In, the case described, each assembly is composed of five cells 210, but the number n of said cells can be different, since it is chosen according to the range of diameters to be measured. A cell assembly, for example, has the following feature: the upper part of the assembly comprises three emitter-receivers e and two reflectors r, while the lower part comprises three reflectors and two emitters, each emitter e being placed perpendicular to a reflector r. The pitch of the cell elements being 25.4 mm, that is, 1 inch (the difference in diameters between consecutive rims in the range of tires for passenger vehicles in the present case being one inch), this arrangement enables each light beam to strike the corresponding reflector correctly and not the adjacent cell. The number of cells 210 provided, on one side above and on the other below, makes possible the recognition of the inner diameter of the tire P, measured at the bead toes.

Figure 3A:
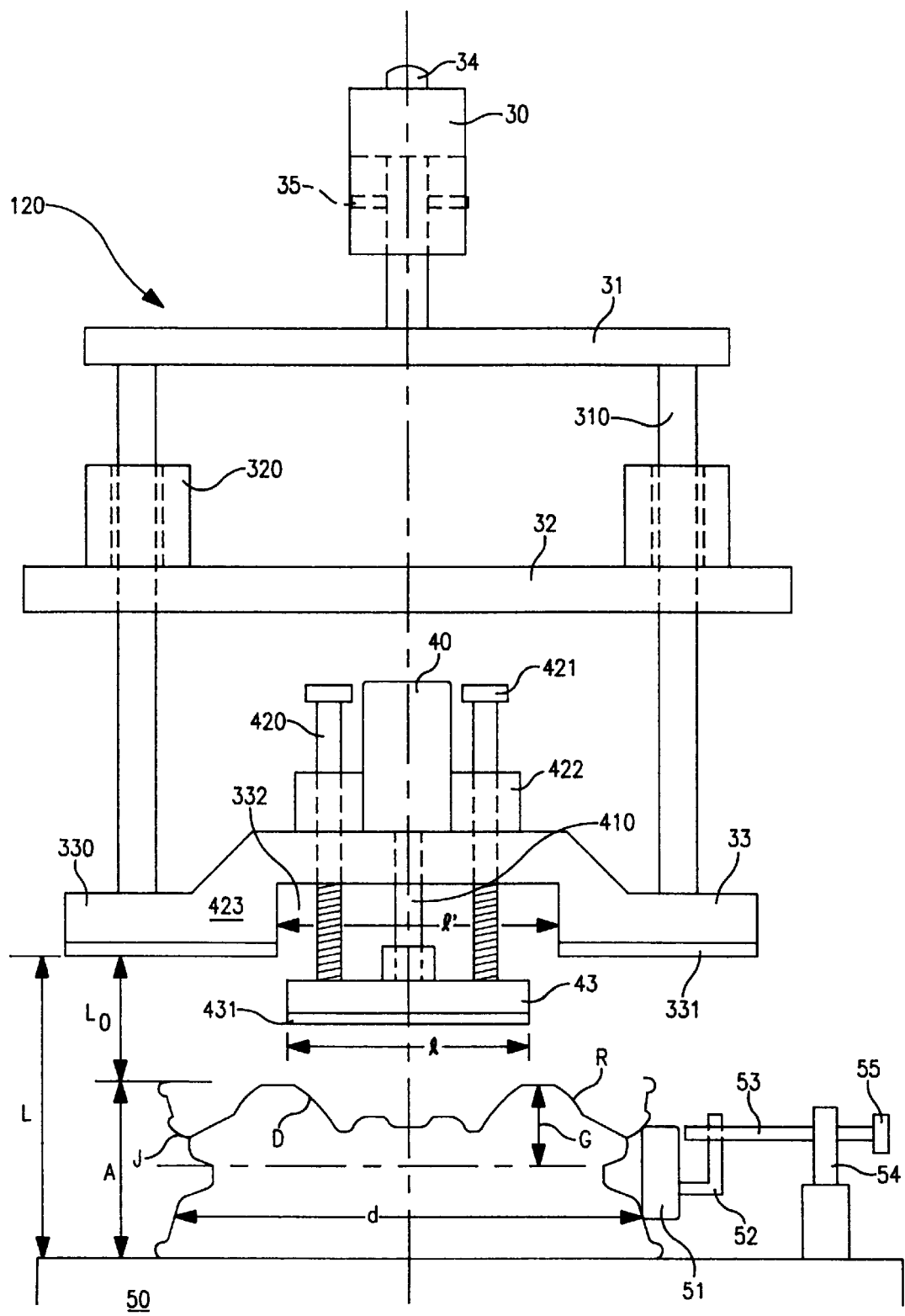
FIGS. 3A to 3C schematically represent the device which makes possible the check of conformity of the wheel.

Referring to FIG. 3A, the machine 12 for checking conformity of the dimensions of the wheel R and, in particular, the overall width A of the rim J of the wheel R, as defined by international standards (TRA, ETRTO, for example), the outline G of the wheel disk D, defined as being the distance to the equatorial plane of the wheel R of the most distant parts of the disk D, and, finally, the diameter d of the wheel R, performs the three operations simultaneously. The machine 12 comprises an apparatus 120 which has an upper jack 30 for the displacement of an upper platform 31 equipped with guide rods 310, passing through guide bushings 320 of a middle platform 32 and transmitting motion to a lower platform or support 33. Said platform 33, rectangular in shape as seen from above, and whose length is greater than the greatest overall diameter of the wheel R within the range to be measured, has its two ends 330 each equipped with a plastic sensor 331, in this case of molded polyamide 6 produced under the name of Ertalon, making it possible to avoid damage to the wheels. The lower platform 33 has a radial recess 332 in the middle in order to permit the insertion and movement of a rectangular support plate 43 perpendicular to the rectangular shape of support 33 and whose width l is less than the width l' of the recess 332. The support plate 43 is an integral part of the mechanism designed to measure the outline G of wheel R, a mechanism comprising a jack 40, integral with platform 33, and its rod 410 making possible the displacement of plate 43, said plate being connected to two guide rods 420 securing the displacement of plate 43 in relation to the support 33, said rods being equipped on one side, at the upper ends, with stops 421 bearing on the guide bushings 422 and on the other with springs 423 to make possible the return of plate 43 to normal position. Said plate 43 is also covered at its bottom with a plastic sensor 431.

While measuring the vertical displacement of the support 33—the overall width A of the rim J of the wheel R being measured by the difference between the initial distance L between the radial end of the sensor 331 and the bearing table 50 and displacement LO of the sensor—is carried out by means of an ultrasonic detector 34, the reflecting obstacle being a washer 35 integral with the jack rod 30, the measurement of vertical displacement of the sensor 431 is carried out by means of a linear potentiometer having a power supply under 10 volts.

Figure 3B:
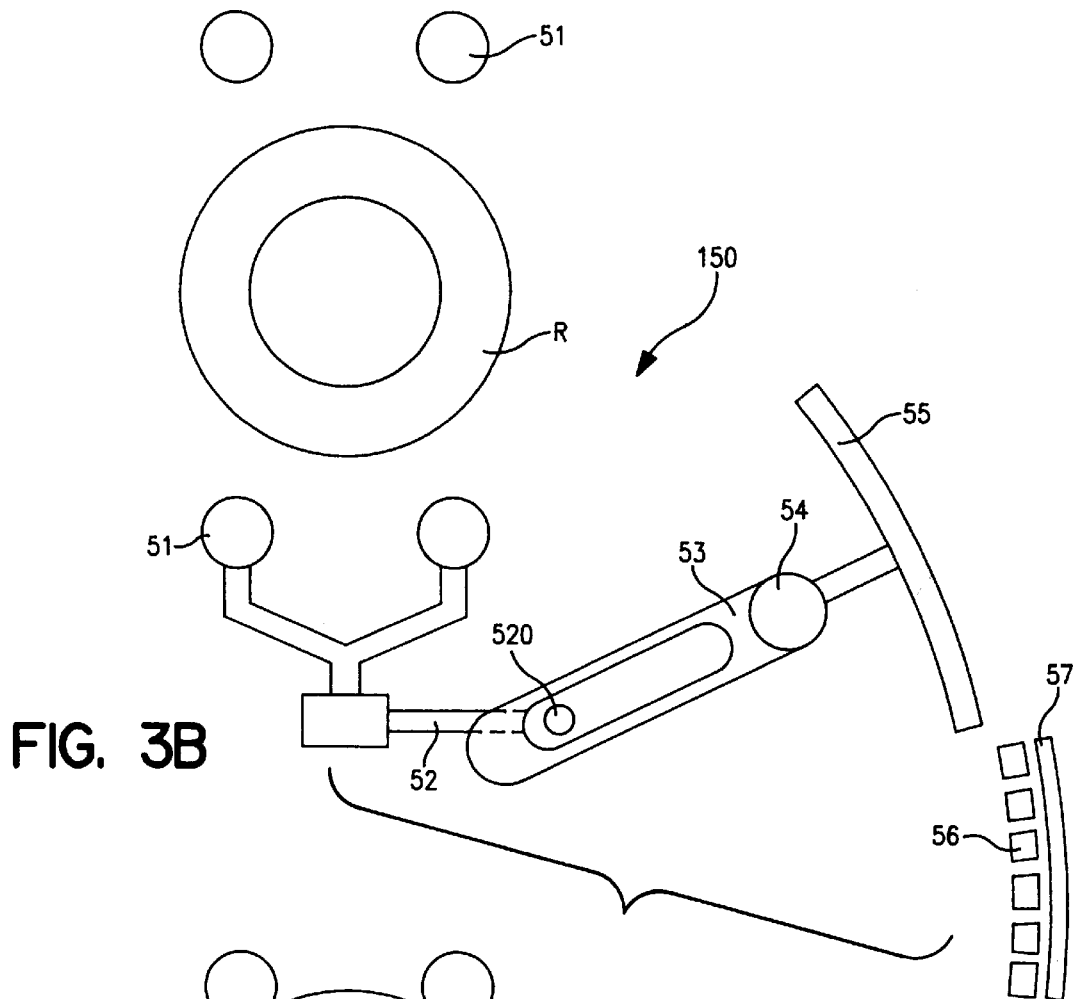
Figure 3C:
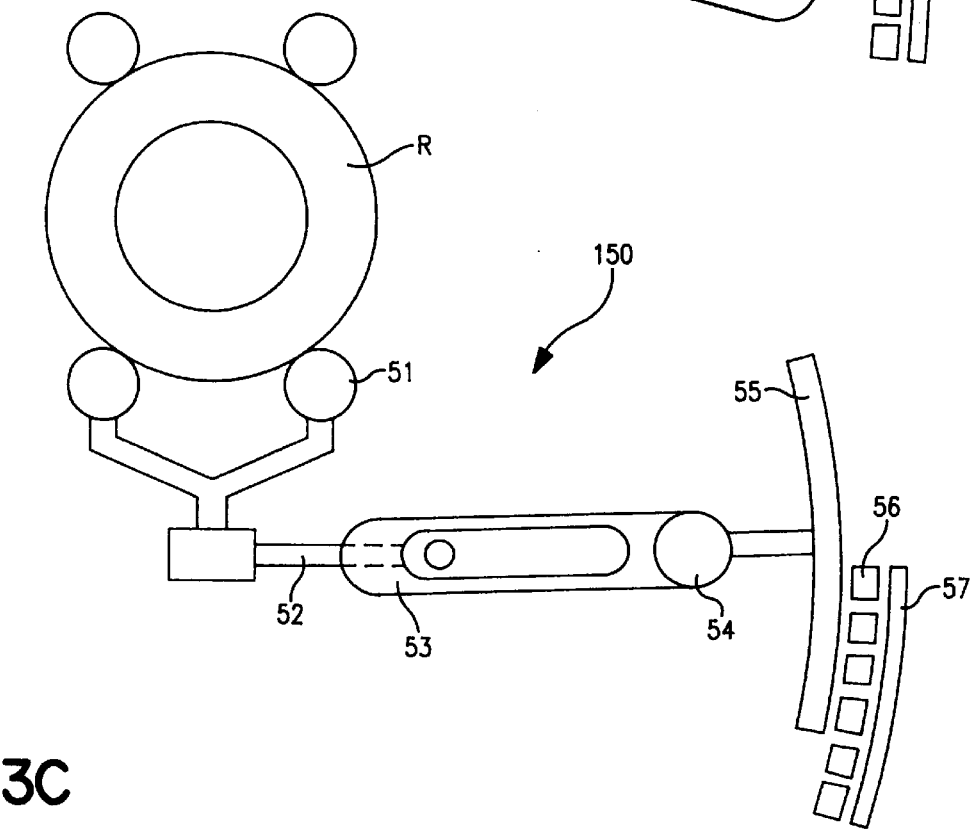

The device for checking conformity of the dimensions of the wheel R also comprises a centering system 150 consisting of centering rollers 51 (FIGS. 3B and 3C). A bent rod 52 is fastened on the support arm of two rollers, the end 520 of the rod engaging the slot of an arm 53 that can be rotated on a fixed pin 54. The arm 53 is equipped at its end with an arcuate metal plate or cam 55 of narrow width, said plate being capable, by rotation on the pin 54, of being positioned opposite one or more induction detectors 56 mounted on a frame 57.

The pressure rollers 51, which, under the effect of a jack (not shown), are applied against the wheel rim J (FIG. 3C) at a specific place on said rim (FIG. 3A). As they move toward the wheel R, rotation is imparted to the plate 55 through the drive rod 52 and arm 53. Depending on the diameter of the circle of impact of the rollers on the wheel rim, the plate 55 is brought opposite one or more induction detectors 56. The number of detectors 56 activated makes possible identification of the wheel with the correct diameter or the presence of an unsuitable wheel.

The mounting assembly line according to the invention includes, finally, positioned at the exit of the warehouse before packing in suitable means of transportation, a device 13 capable of detecting not only the inflation pressure anomalies of the tire P of the assembly E, but also any anomaly that can be revealed by a difference in shape and/or in stiffness of the sidewalls of the tire P, such as a tire not matching the flange width, or a tire unacceptable in its internal structure, as well as a rim J of the right size but of irregular shape according to the circumference.

Figure 4:
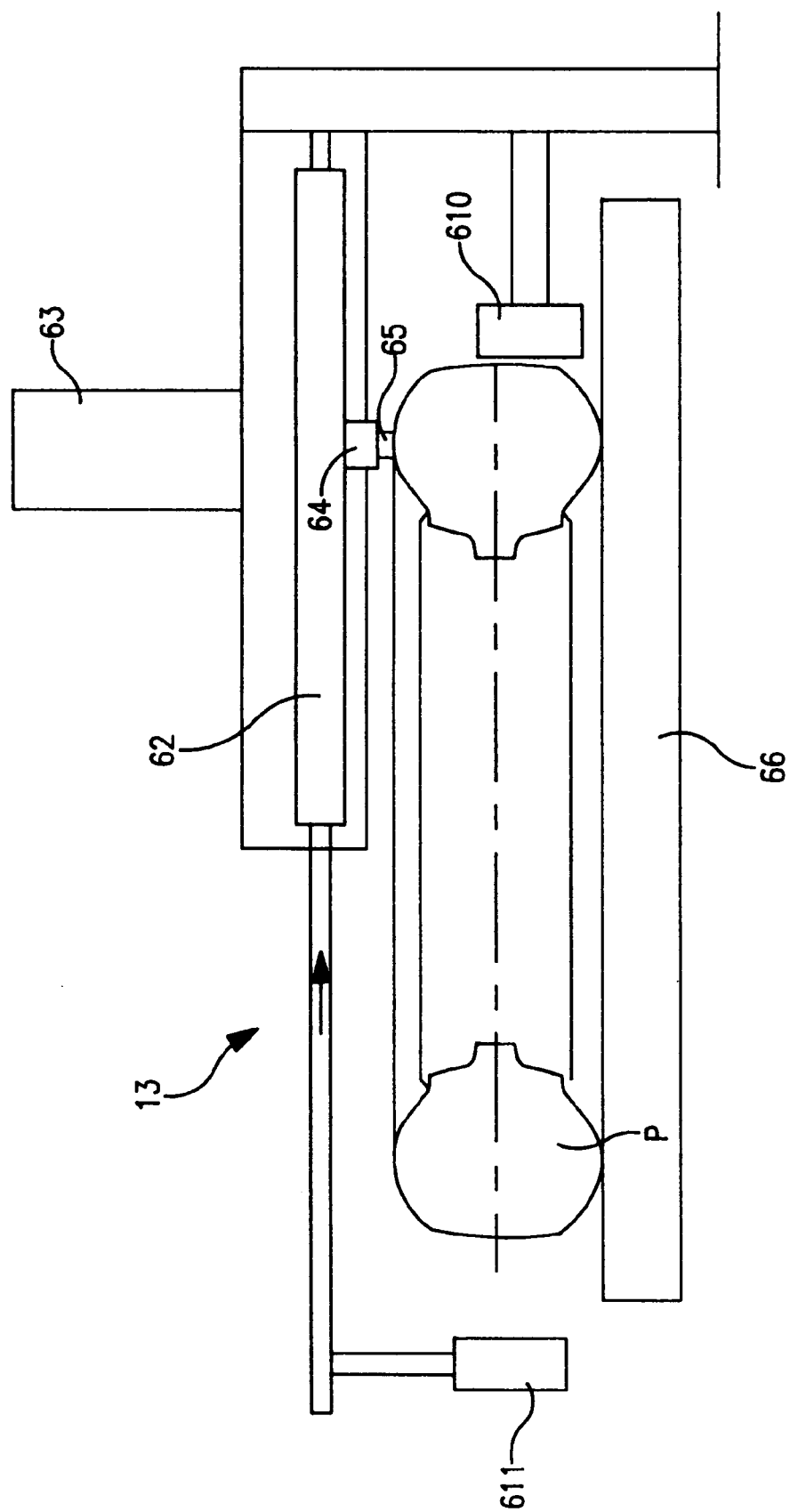
FIG. 4 is a diagram of the apparatus for checking conformity of the mounted assembly before delivery to the customer.

The device 13 (FIG. 4) comprises a centering system and a measuring system. The centering system is composed of four centering rollers 61, two 610 being stationary and integral with the frame of the device and the other two being mobile under the action of a jack 62 integral with said frame. The measuring system comprises a jack 63 making possible the vertical displacement of a rod 64, equipped at its end with a plastic circular sensor 65, said sensor being capable, after contact with the upper sidewall of the tire P on a table with rollers 66, of being embedded in said sidewall roughly at the maximum axial width of the tire. The sensor 65 is embedded at constant force, which is made possible by perfect control of the air supply of the jack 63. Measurement of the penetration or vertical displacement of the sensor is made by means of a linear potentiometer. The value measured should come within statistically preestablished tolerances and, otherwise, a second measurement is taken for confirmation. Depending on the response, the product is passed or rejected.

We claim:

1. An assembly line which includes a machine for mounting a tire on a wheel, a device for inflating the tire mounted on the wheel, a machine for placement of bead heels of the tire and a balancing machine, characterized in that said assembly line further comprises at least one means for checking conformity of the diameter of the tire to be mounted and means of checking conformity of the diameter of the wheel, so that matching of the wheel to the tire conforms to a mounted assembly requirement of a manufacturing custom.

2. An assembly line according to claim 1, including, at the end of the line, means for detecting unacceptably mounted tire and wheel assemblies.

3. An assembly according to claim 1, in which the means for checking conformity of the diameter of the tire to be mounted include means for measuring said diameter, said diameter being measured at a bead toe of the tire, which includes assemblies of photoelectric cells mounted above and below the tire placed flat and centered on a recessed support having ball bearings.

4. An assembly according to claim 1, in which the wheel has a rim, and the means for checking conformity of the dimensions of the wheel simultaneously measure the overall width of the rim of the wheel and an outline of a disk of the wheel, while checking at the same time the diameter of the rim and comprise a centering system equipped with a cam assembly, detectors for checking conformity of the wheel diameter, and an apparatus having supports on which sensors are mounted for application on a flange of the rim and on a disk respectively.

5. An assembly according to claim 2, further comprising a system for centering the tire and a system for measurement comprising a sensor which is pressed against one of the sidewalls of the tire with a constant force.

* * * * *

UNITED STATES PATENT AND TRADEMARK OFFICE
CERTIFICATE OF CORRECTION

PATENT NO. : 6,199,270 B1  Page 1 of 1
DATED : March 13, 2001
INVENTOR(S) : Menard et al.

It is certified that error appears in the above-identified patent and that said Letters Patent is hereby corrected as shown below:

Column 5,
Line 27, "custom." should read -- customer. --

Signed and Sealed this

Thirtieth Day of April, 2002

Attest:

Attesting Officer

JAMES E. ROGAN
Director of the United States Patent and Trademark Office